W. V. TURNER.
BRAKE VALVE DEVICE.
APPLICATION FILED OCT. 6, 1914.
1,143,334.
Patented June 15, 1915.
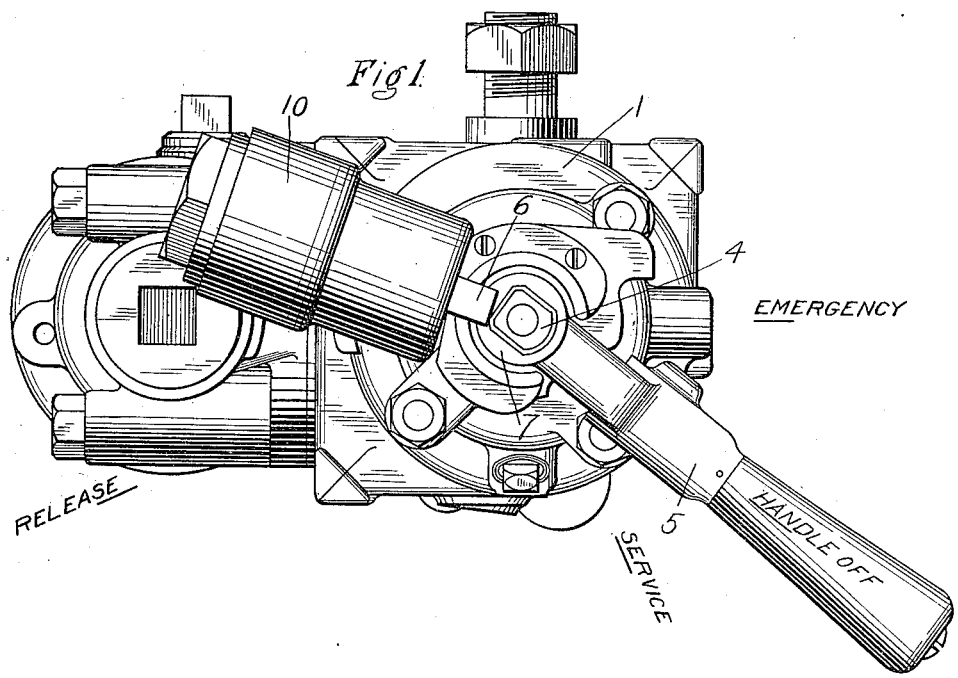
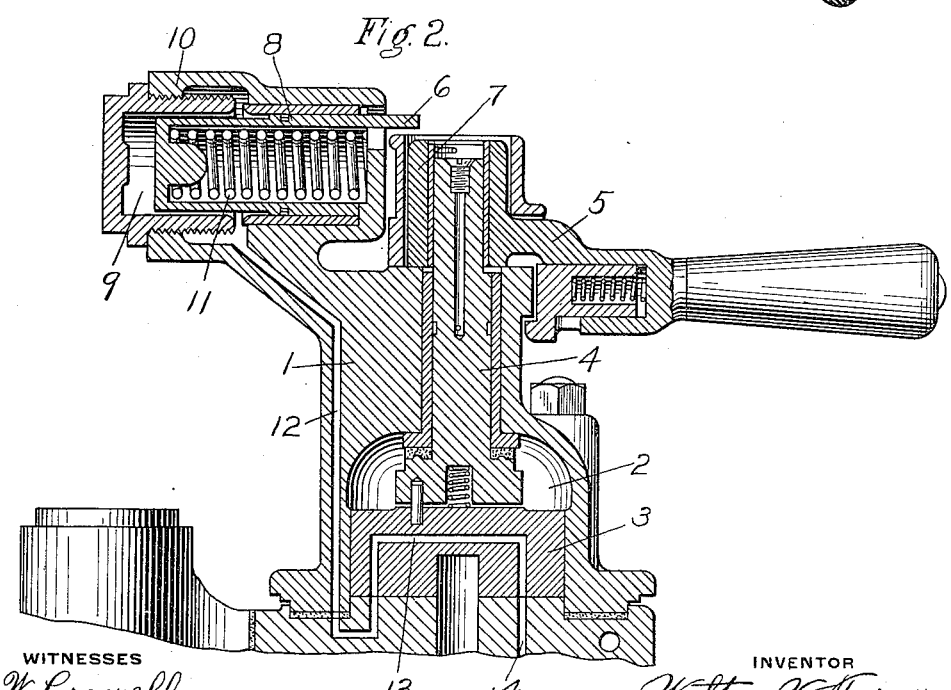
WITNESSES
H. W. Crowell.
G. M. Clements.
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

1,143,334.	Specification of Letters Patent.	Patented June 15, 1915.

Application filed October 6, 1914. Serial No. 865,255.

*To all whom it may concern:*

Be it known that I, WALTER V. TURNER, a citizen of the United States, residing at Edgewood, in the county of Allegheny and State of Pennsylvania, have invented new and useful Improvements in Brake-Valve Devices, of which the following is a specification.

This invention relates to fluid pressure brakes, and more particularly to a brake valve device.

With the fluid pressure brake equipment usually employed in traction service, when the end of a run is reached, the motorman removes the brake valve handle and changes ends.

It is highly desirable before changing ends, that the brakes be applied, especially if the train is standing on a grade, and while this is often made a rule of operation, the motorman sometimes neglects to obey the rule, thus making a runaway possible with its consequent harmful results.

The principal object of my invention is to provide means for preventing the removal of the brake valve handle until the brakes have been applied.

In the accompanying drawing; Figure 1 is a plan view of a brake valve device with my improvement applied thereto and Fig. 2 a vertical sectional view of the brake valve device.

The brake valve device may comprise the usual casing 1 having a valve chamber 2 containing the rotary valve 3 which is adapted to be operated through the valve stem 4, having the usual keyed end for the reception of the operating handle 5.

According to a preferred construction of my invention, a locking finger 6 is provided which is adapted to extend out over the key sleeve of the brake valve handle and thereby prevent removal of the handle.

The finger 6 is operated by a hollow piston 8 working in a piston chamber 9 of an auxiliary casing 10 adapted to be secured to the brake valve casing 1. One side of the piston 8 is open to the atmosphere and is subject to the presssure of a coil spring 11, while the piston chamber 9 at the opposite side is connected to a passage 12 leading to the seat of the rotary valve 3. In the off position of the rotary valve, or the position in which the brake valve handle 5 is removable, a cavity 13 in the valve connects passage 12 with a passage 14 leading to the brake pipe. The tension of the spring 11 is such that when the brake pipe pressure acting in piston chamber 9 is less than the predetermined degree necessary to give the desired brake application, the spring will operate the piston 8 against the reduced brake pipe pressure and thereby retract the locking finger 6.

In operation, during the usual movements of the brake valve handle, the passage 12 is blanked and the spring 11 holds the piston 8 and the finger 6 in the retracted position. If it is desired to change ends and the handle 5 is to be removed, the motorman first makes a reduction in brake pipe pressure so as to effect an application of the brakes. The motorman then turns the brake valve handle to off position, in which the cavity 13 connects passage 12 with brake pipe passage 14. If the desired reduction in brake pipe pressure has been made, it will be evident that the spring 11 will hold the piston 8 and the finger 6 retracted, so that the handle 5 may be removed in the usual manner, but if the brake pipe pressure has not been reduced, then the same will act on the piston 8 to shift the finger 6 into position for locking the handle 5 against removal.

It will now be clear that with my invention, the motorman cannot remove the brake valve handle unless a predetermined reduction in brake pipe pressure has first been effected and the brakes thus applied.

It will be understood that the brake valve handle must be turned to off position before closing the usual cut-out cock, as otherwise the brake pipe pressure could not get to the piston 8 unless a separate always open pipe connection to the brake pipe be provided.

Having now described my invention, what I claim as new and desire to secure by Letters Patent, is:—

1. In a brake valve device, the combination with a brake valve handle, of means for preventing the removal of the handle unless the brakes have been applied.

2. In a brake valve device, the combination with a removable brake valve handle, of a device for locking the brake valve handle against removal and operated upon a predetermined reduction in brake pipe pressure for releasing the handle to permit removal thereof.

3. In a brake valve device, the combination with a removable brake valve handle, of a device for preventing removal of the brake valve handle and subject in the removal position on one side to brake pipe pressure and a spring for holding said device retracted at a predetermined reduction in brake pipe pressure to thereby permit removal of the handle.

4. In a brake valve device, the combination with a valve and a handle for operating said valve and removable in one position, of a finger adapted to prevent removal of the handle, a piston subject on one side to the pressure of a spring for operating said finger and means for admitting fluid from the brake pipe to the opposite side of said piston in the removal position of the valve.

5. In a brake valve device, the combination with a valve having an off position and a handle removable in off position for operating said valve; of an extension for preventing removal of the handle, a piston open on one side to brake pipe pressure in the off position of the valve for operating said extension, and a spring for retracting said piston and thereby said extension from the locking position when the brake pipe pressure is less than a predetermined degree.

In testimony whereof I have hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."